United States Patent [19]

Saugeon

[11] Patent Number: 4,733,562

[45] Date of Patent: Mar. 29, 1988

[54] METHOD AND APPARATUS FOR ULTRASONIC SCANNING OF AN OBJECT

[75] Inventor: Ulrich Saugeon, Nuremberg, Fed. Rep. of Germany

[73] Assignee: Siemens Aktiengesellschaft, Berlin and Munich, Fed. Rep. of Germany

[21] Appl. No.: 884,590

[22] Filed: Jul. 11, 1986

[30] Foreign Application Priority Data

Jul. 15, 1985 [DE] Fed. Rep. of Germany ....... 3525179

[51] Int. Cl.⁴ ............................................. G01N 29/04
[52] U.S. Cl. ........................................ 73/626; 73/628; 128/660
[58] Field of Search ................... 73/626, 628; 128/660

[56] References Cited

U.S. PATENT DOCUMENTS

| | | | |
|---|---|---|---|
| 3,810,082 | 5/1974 | Arens | 340/6 R |
| 4,247,900 | 1/1981 | Martin et al. | 364/581 |
| 4,252,026 | 2/1981 | Robinson | 73/626 |
| 4,254,662 | 3/1981 | Kuroda et al. | 73/626 |
| 4,325,257 | 4/1982 | Kino et al. | 73/626 |
| 4,448,075 | 5/1984 | Takemura et al. | 73/626 |
| 4,505,156 | 3/1985 | Questo | 73/626 |
| 4,553,437 | 11/1985 | Luthra et al. | 73/626 |
| 4,604,697 | 8/1986 | Luthra et al. | 128/660 |
| 4,611,494 | 9/1986 | Uchiyama | 128/660 |

FOREIGN PATENT DOCUMENTS 2834284 2/1979 Fed. Rep. of Germany.
3121513 12/1982 Fed. Rep. of Germany.
3303288 4/1985 Fed. Rep. of Germany.

OTHER PUBLICATIONS

Academic Press, Inc., "Ultrasonic Imaging", 1982, Shattuck et al., pp. 93 to 107.

Primary Examiner—Stewart J. Levy
Assistant Examiner—Louis M. Arana
Attorney, Agent, or Firm—Lawrence C. Edelman

[57] ABSTRACT

An ultrasonic array having a number of juxtaposed transducer elements is used for imaging. The reception aperture of the array is divided into individual sub-arrays. Each of these sub-arrays receives, after emission of an ultrasonic signal correlated with it into the object, echo signals reflected therefrom. The echo signals received by the respective sub-array and which are reflected from a common focal point are added up to form a sum signal. For this purpose, at least for some of the transducer elements the delivered output signals are time-delayed according to given patterns. This procedure is repeated for various points along each scan line. The sequentially obtained sum signals are superimposed at each point of the scan line to form a received signal. With this line-oriented method, the same processing channels (time-delays) can be used several times, i.e. successively for each sub-array. This leads to cost-effective production.

22 Claims, 9 Drawing Figures

METHOD AND APPARATUS FOR ULTRASONIC SCANNING OF AN OBJECT

BACKGROUND OF THE INVENTION

1. Field of the Invention

The invention relates to a method and apparatus for the scanning of an object by means of ultrasound using an ultrasonic transducer array comprising a number of transducer elements lying side by side wherein for at least some of the transducer elements the output signals delivered upon reception of echo signals can be time-delayed. Preferentially, it involves an ultrasonic scanning method for a linear, trapezoidal or phased-array system which is used in the medical sector for the examination or patients and which serves for the imaging of structures inside the body.

2. Description of the Prior Art

In ultrasound diagnostic equipment and, in particular, transducer array devices, the imaging quality is substantially improved by focusing. In a pivoting system, that is, e.g., in a so-called phased-array system, in addition to focusing, long delay times which are required for adjustment of the control angle must be made available. To obtain high resolution, and for simultaneous extensive restriction or even prevention of grating lobes, the receiving delay unit of the array system must have a plurality of parallel channels, e.g., 64 in a phased-array system. Such channels are quite expensive because of the required high accuracy of adjustment.

Therefore, to provide an inexpensive ultrasonic scanner, the number of active delay channels should be reduced.

In a conventional phased-array or linear-array system, focusing on a fixed point is carried out by adding up the output signals of all transducer elements of the reception aperture (e.g. N=64) simultaneously. The advantage of this method is that one can operate at maximum frame frequency. This is of great importance, especially in cardiological applications, where high speed signal processsing is essential. In applications in the abdominal region, the parameter "resolution" is of greater importance. Here, a certain loss (tradeoff) of frame frequency in favor of resolution is acceptable, because as a rule only slowly changing processes are being imaged.

SUMMARY OF THE INVENTION

It is an object of the invention to provide a method and apparatus by which reduction of the active delay channels, without loss of resolution and in particular without loss of image quality, is possible in a linear or phased-array system.

The invention is based on the reasoning that a high resolution and hence a good image quality is also possible through the multiple utilization of the (expensive) receiving electronics present in an ultrasonic scanner, thereby resulting in a cost-effective design.

In the method according to the invention, this problem is solved by the feature that during recetion, an effective reception aperture of the ultrasonic transducer array is divided into individual sub-arrays, of which are sub-array after emission of an ultrasonic transmission signal into the object, receives the incoming echo signals. The echo signals received from the sub-arrays are combined to form a sum signal which corresponds to the echo signals reflected from a common focus. The sequentially obtained sum signals are superimposed to form a received signal for the total effective reception aperture. The received signal can then be displayed in a conventional manner.

Ultrasound equipment for the performance of the inventive method contains a means for activating different sub-arrays when scanning one and the same scan line. In other words, a given reception aperture is subdivided into individual sections or sub-arrays, the summation result of which are sequentially superimposed. This can take place, for example, only after completion of several ultrasonic scan lines. This signal processing method is permissible for the delay, as the focusing involves a linear process.

An advantage of the method and apparatus according to the invention is evident from the following reasoning: As has been mentioned above, in conventional array equipments the desired resolution and hence the reception aperture length is realized by a complete, parallel-going delay unit with a large number of delay channels. For example, in a prior art phased-array system with 64 transmission elements, a delay unit with 64 parallel delay channels is provided. However, if the reception aperture was subdivided according to the invention into two (or more) sub-arrays, only 64/2=32 delay channels (or even fewer) would be needed in such a phased-array system.

For a fuller understanding of the of the features and advantages of the present invention, reference should now be made to the following detailed description of preferred embodiments of the invention and to the accompanying drawing.

DETAILED DESCRIPTION OF THE INVENTION

Figure 1:
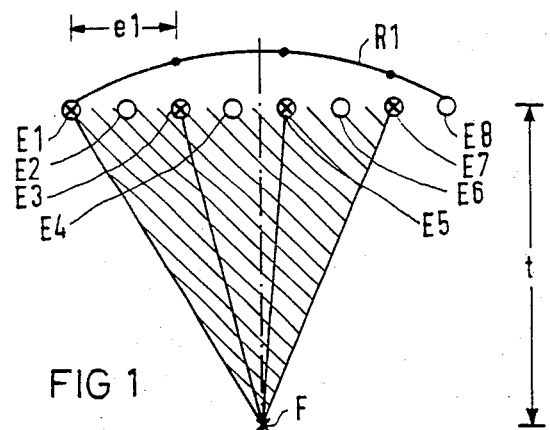
FIGS. 1, 2 and 3 illustrate a first embodiment of the invention having a reception aperture consisting of two interconnected sub-arrays, where first one and then the other of the sub-arrays is switched to reception, resulting after superposition of the received sub-array signals, in a received signal according to the effective total aperture.
Figure 2:
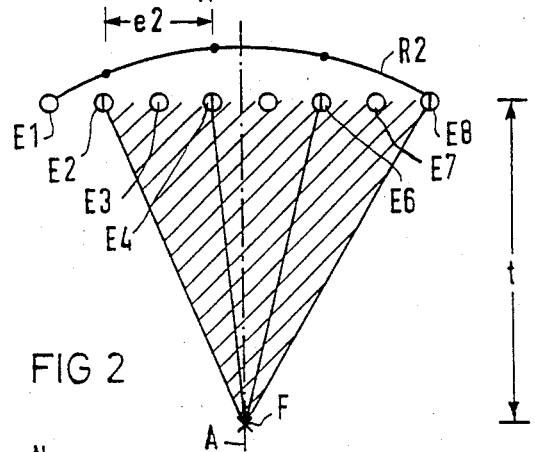
Figure 3:
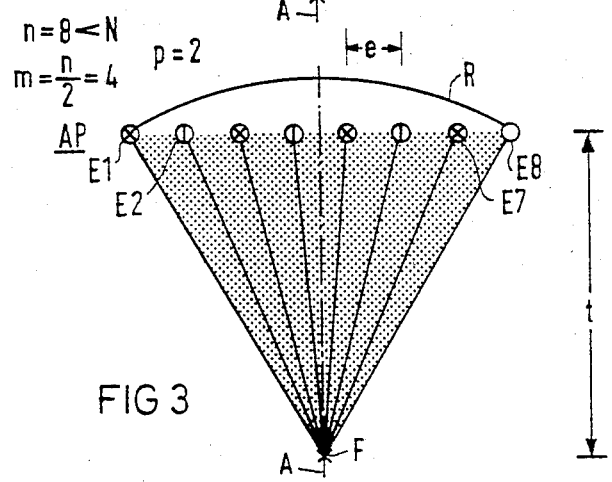

A first form of realization for the ultrasonic scanning of an object, in particular of a human patient, is illustrated in FIGS. 1–3. A reception aperture AP (FIG. 3) just needed for the desired resolution comprises a total of n=8 ultrasonic transducer elements lying side by side in a plane, which are marked E1, E2, . . . E7, E8. There are in all N>n ultrasonic transducer elements. In a phased-array equipment the number N may be for example N=64. Of the N transducer elements, E1 . . . E8 are a group which in the course of the ultrasonic scanning progresses in known manner from left to right across the entire ultrasonic array (known as group stepping).

According to FIGS. 1 and 2, the reception aperture is electrically divided into two sub-arrays, which are intermeshed or inserted into one another and are actuated successively in different ultrasound reception phases. The first sub-array is evident from FIG. 1. It contains all odd-numbered aperture elements E1, E3, E5 and E7 and has a beam path illustrated by line shading along a first diagonal. The second sub-array is illustrated in FIG. 2 and contains all even-numbered aperture elements E2, E4, E6 and E8 and has a beam path indicated by line shading along a second diagonal. Initially, the first sub-array consisting of elements E1, E3, E5, E7 is actuated according to FIG. 1. This is indicated by small crosses in the respective element symbols E1, E3, E5, E7 in FIG. 1. Thereafter, the second sub-array is actuated according to FIG. 2. This is indicated by small strokes in the respective element symbols E2, E4, E6, E8 in FIG. 2. The acutation of the sub-arrays thus occurs successively in time.

Each of the two sub-arrays is addressed according to FIG. 1 and 2 with separate delay information so as to cause focusing on the same site or focal point F in the depth "t", i.e., approximately in the same direction (scan line A) as the total or resultant reception aperture AP (cf. FIG. 3). This delay information is shown in FIGS. 1 and 2 in the form of delay curves R1 and R2. Preferably, both delay curves R1, R2 have the same shape. The distance of the respective one of delay curves R1, R2 from the plane of transducer elements E1, E2 . . . E8 is illustrative of the respective delay time for the transducer element situated there below. As illustrated, a symmetrical shape for delay curves R1, R2 has been chosen. Accordingly, the two outer transducer elements E1 and E8 undergo no delay when actuated for reception, while the delay of actuation for the central transducer elements E4 and E5 is greatest.

According to the form of realization of FIGS. 1 to 3, $p=2$ intermeshing or interleaved sub-arrays are provided in all. The method here described is not limited to $p=2$; in principle $p=3,4$ . . . sub-arrays may also be provided.

FIG. 3 illustrates what beam path (shown in stipple shading) would result if the sub-arrays shown in FIGS. 1 and 2 would operate simultaneously rather than sequentially. Thus FIG. 3 shows a superposition of the results obtained sequentially from the first and second sub-arrays. It should be noted that because $p=2$, the elementary raster scan e in FIG. 3 is half as lone as elementary raster scans e1 and e2 illustrated in the two sub-arrays of FIGS. 1 and 2.

Due to the double distance $e1=e2=2e$ of the transducer elements of the two sub-arrays of FIGS. 1 and 2 as compared with the resultant array according to FIG. 3, additional responses (so-called grating lobes) may occur in the directional characteristic of the sub-arrays, even if the directional characteristic of the resultant reception aperture AP does not contain these grating lobes. This is the case, for example when the elementary raster e of the total aperture AP according to FIG. 3 is exactly 0.5 lambda, lambda being the wavelength of the received ultrasound, (corresponding to the condition when elementary raster $e1=e2$ of the sub-arrays according to FIGS. 1 and 2 is exactly 1.0 lambda). However, the grating lobes of the two sub-arrays disappear with a summation of the two sub-array data into a sum signal, since the phase position of these grating lobes in the two sub-arrays are shifted from one another by 180°.

To obtain a received signal which can be used for imaging with the resultant aperture AP (cf. FIG. 3), each ultrasound transmission signal ("ultrasound vector") is transmitted $p=2$ times. The focusing and direction of the transmission is identical for each of the two ultrasound vectors and relates to the resultant ultrasound array according to FIG. 3. In other words, initially a first transmission signal is sent into the object along the given scan line A. Then, with the first sub-array E1, E3, E5, E7, which as a result of the delay times per delay curve R1 is adjusted to the given depth t and the focus F, the incoming echo signals are received and composed into a first sum signal in a processing circuit (not shown). Thereafter, a second ultrasound transmission signal is sent into the object along the same given scan line A. Subsequently, the incoming echo signals are received with the second sub-array of FIG. 2, which differs from that of FIG. 1 but which due to its delay curve R2 is likewise directed to the same given depth t and focus F along scan line A. The incoming echo signals are composed to a second sum signal in the previously mentioned processing circuit. Then, at least the first and second sum signals (with additional sub-arrays additional sum signals may be added) are superimposed. This results in the desired received signal for the given depth t, in accordance with the resultant ultrasonic array of FIG. 3.

With this processing method, the sum signal of each of the two sub-arrays for the duration of the total ultrasound vector can be stored in a memory. After completion of two ultrasound vectors, the sum signals of the two sub-arrays can then be added up; the summation result of the resultant aperture AP thus obtained is the desired received signal.

This method of signal processing, where incoming sum signals for a scan line A are completely stored twice, may be two time-consuming for some applications. A more time-saving procedure will be described later with reference to FIG. 9.

It should be emphasized, however, that for the first sum signal, which is obtained with the first sub-array of FIG. 1, and for the second sum signal, which is obtained with the second sub-array of FIG. 2, the same processing unit, in particular the same delay unit with a reduced number of delay elements or channels, can be successively used.

Figure 4:
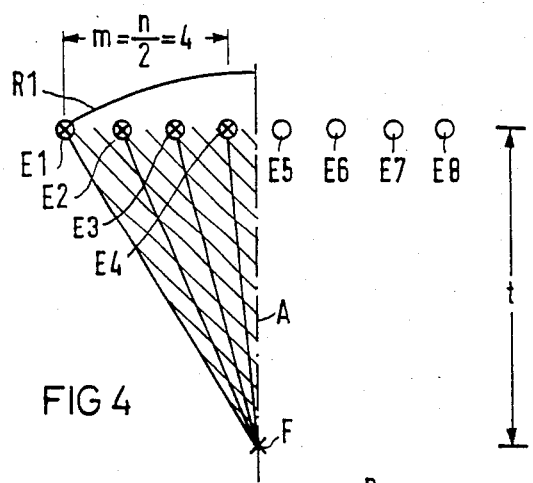
FIGS. 4, 5, and 6 illustrate a second embodiment of the invention in which two sub-arrays lying side by side are used to form a received signal according to the effective total aperture.
Figure 5:
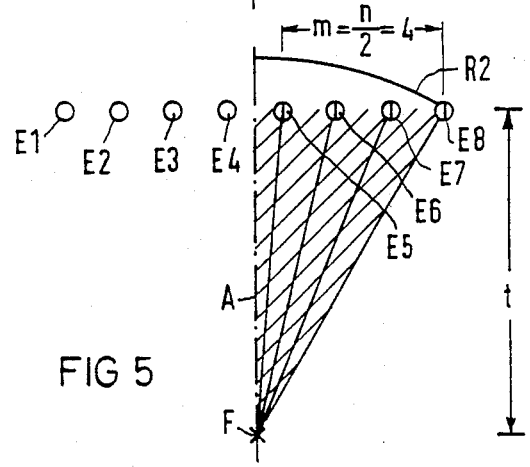
Figure 6:
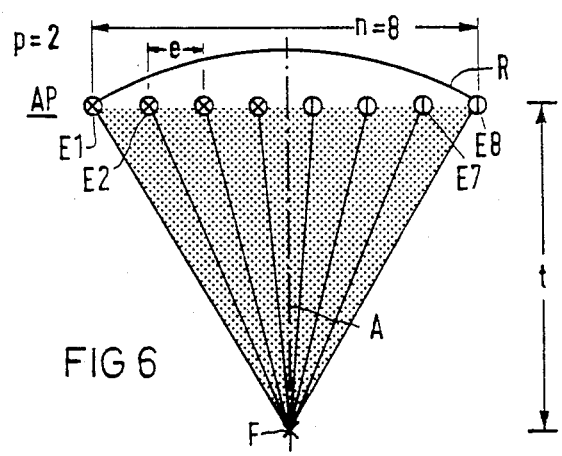

A second form of realization for the scanning of an object by ultrasound is illustrated in FIGS. 4 to 6. Here too, a total of $n=8$ ultrasonic transducer elements E1, E2, E3, . . . E7, E8, arranged side by side, are provided. The resultant aperture AP (cf. FIG. 6) is here formed from two adjacent halves. The left half contains sub-array elements E1 to E4, ($m=$number of elements per sub-array$=4$), and the right half contains sub-array elements E5 to E8 ($m=4$). Naturally, the number n of transducer elements E1, E2 . . . may be other than 8. Initially, the first sub-array of FIG. 4 is actuated or activated for reception and then the second sub-array of FIG. 5. As in the realizations of FIGS. 1-3, each sub-array is addressed with its own delay information R1, R2, which permits focusing on the same site, i.e. the focus F at the depth t, and in the same direction, i.e. after composition to the total aperture AP in the direction of scan line A.

It can be said that the resultant array was divided into $p=2$ sub-arrays in all. This division of the resultant aperture AP into two sub-arrays has the result that the resolution of each sub-array is reduced by a factor of 2 and that there occurs a rotation of the directional characteristic of the two sub-arrays by an angle dependent on the focus position F. For the two sub-arrays this angle has opposite signs relative to the resultant array (cf. FIG. 6). That is, for the sub-array of FIG. 4 it lies to the left and for the sub-array of FIG. 5 it lies to the right, of the direction of the resultant array.

Also, as described in the prior realization, two ultrasound vectors are transmitted per scan line A. By summation of the reception data stored thereafter (resulting from these two ultrasound vectors and delivered by the two sub-arrays) here, too, there results the received signal of the resultant array. In this case, however, additional "grating lobes" for the two sub-arrays cannot occur, as the elementary raster e is the same for the sub-arrays (FIGS. 4 and 5) and for the resultant array (FIG. 6).

In this realization it should also be noted that the ultimately desired resultant array (aperture AP) per FIG. 6 may be divided into more than p=2 sub-arrays.

To repeat: Besides the two embodiments per FIGS. 1 to 3 on the one hand and per FIGS. 4 to 6 on the other hand, which represent a division of the total effective aperture AP into p=2 sub-arrays, in principle also a division into more than two sub-arrays is possible. In this case, a compromise must be made between attainable economic efficiency due to multiple utilization of the reception electronics with reduced number of channels and the lower frame frequency resulting therefrom.

Figure 7:
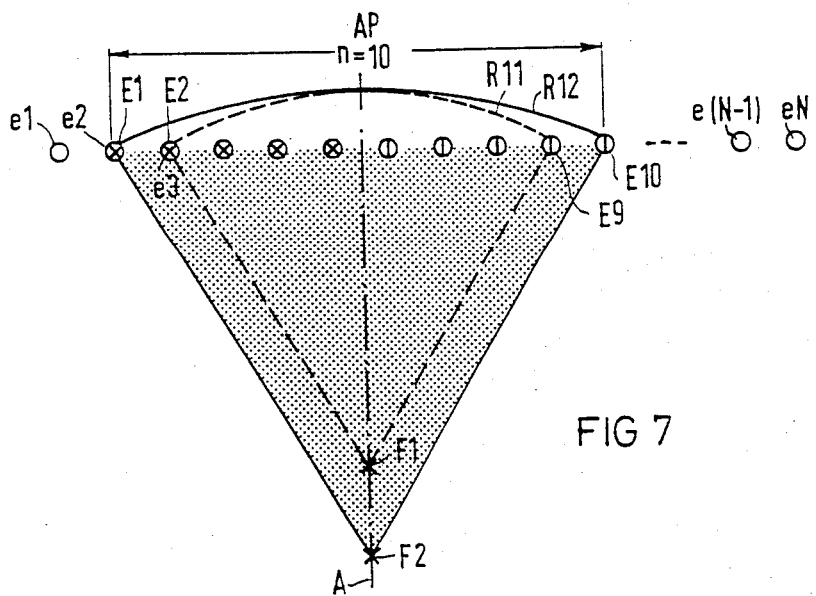
FIG. 7 illustrates focusing to different depth positions along a scan line in accordance with a form of realization according to FIGS. 4–6.

In FIG. 7 it is illustrated that as a result of a delay curve R11 when using n=8 transducer elements, the reception aperture AP is adjusted to a first focal point F1. When focusing on a focal point F2 which is deeper down, appropriately more elements are made use of, in the case given by way of example n=10. In this case, the delay curve is changed and is represented by the curve R12. Obviously, by variation of the effective width n of aperture AP, a variation of the position of the focal point F1, F2, . . . along a scan line A can be brought about. FIG. 7 also illustrates that the n=10 transducer elements E1 to E10 merely represent one group of the total number of existing elements e1, e2, . . . e (N−1), eN included within the ultrasound transducer array.

Figure 8:
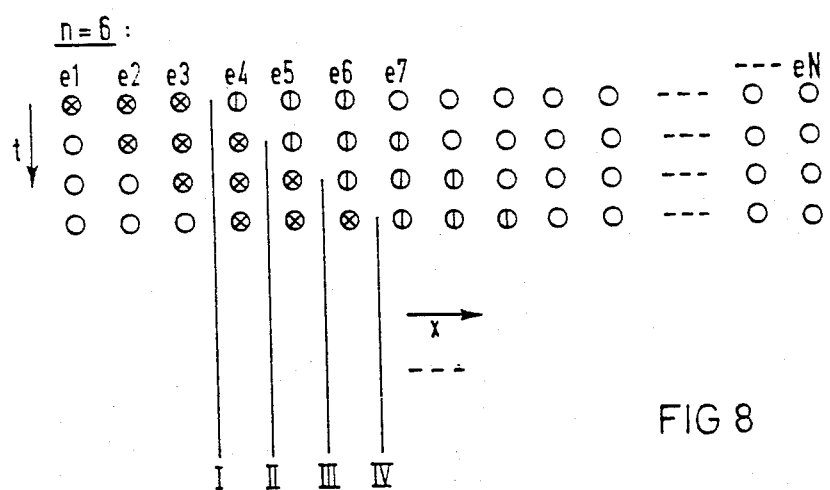
FIG. 8 illustrates the stepping of scan lines I, II, III, . . . for a linear array.

FIG. 8 is a schematic illustration of how group stepping can be carried out in a linear-array. It is assumed here that there are N ultrasonic tranducer elements e1, e2, . . . eN, of which n=6 form the group E1 to E6 to be switched through. In accordance with FIG. 6, in the top line of FIG. 8, first elements e1, e2, e3 and thereafter elements e4, e5, e6 are activated for reception. Superposition of the respective sum signals leads to scanning of a specific point on scan line I. By focus variation, many points along the length of line I can be scanned. In the second line of FIG. 8, elements e2, e3, e4, and thereafter the elements e5, e6 and e7 are activated. This leads to scanning of a specific point along scan line II. By focus variation, many points along the length of scan line II can be scanned. In the third and fourth lines one proceeds analogously with scanning on scan lines III and IV, respectively. Thus, there results a group stepping in scan direction x (indicated by an arrow) with respective scanning of the individual lines I, II, III, . . . In each of lines I, II, . . . transmission takes place twice per scan point in accordance with the previously described technique.

Figure 9:
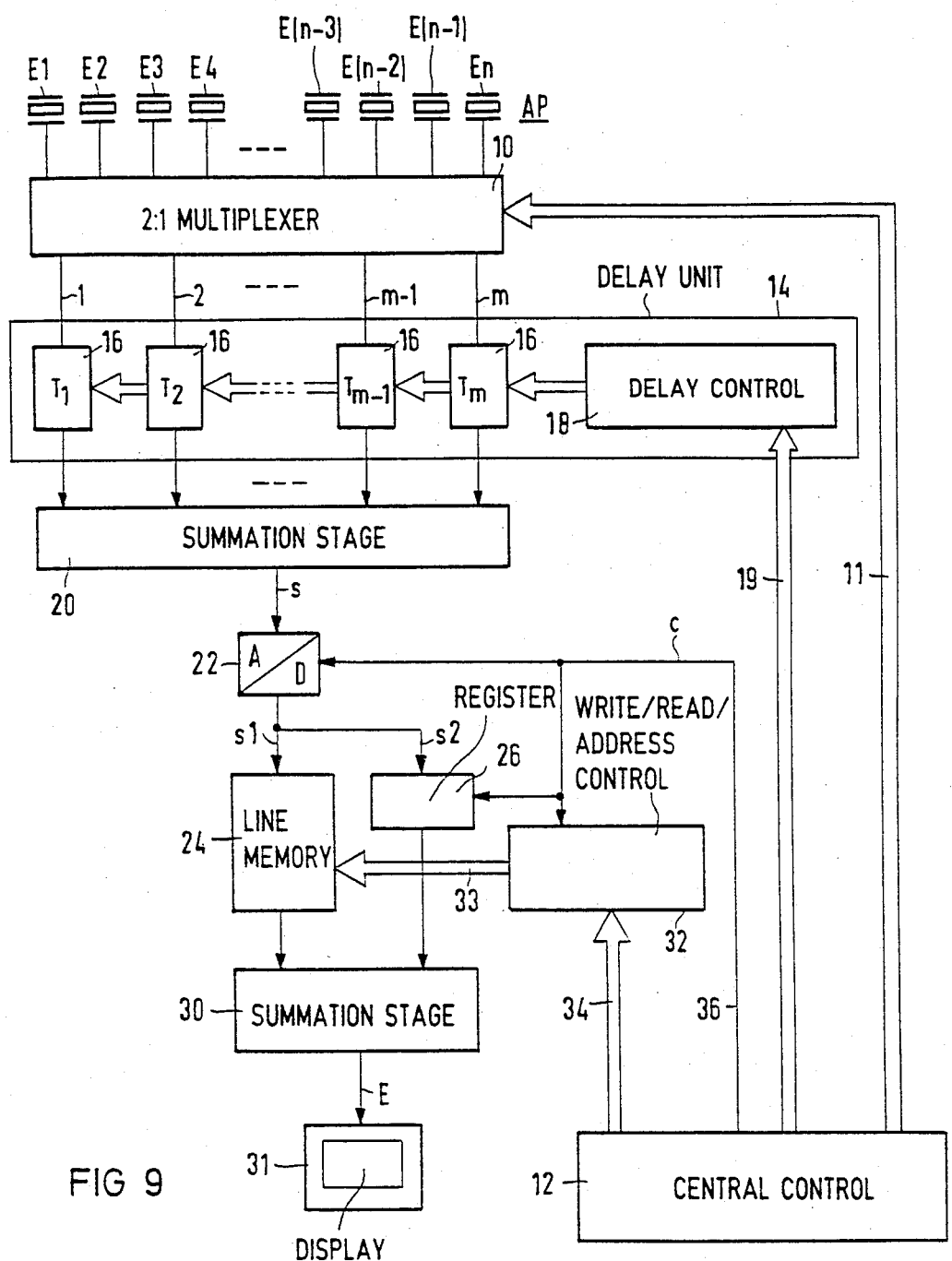
FIG. 9 illustrates a circuit arrangement for carrying out the realizations illustrated in FIGS. 1–3 or 4–6.

FIG. 9 shows a form of realization of an ultrasonic equipment for carrying out the method according to FIGS. 1 to 3 with p interconnected or intermeshing sub-arrays or the method according to FIGS. 4 to 6 with p sub-arrays arranged side by side. In the interest of simple illustration, again p=2. The ultrasonic array has an effective total aperture AP, stepped in the course of time, which comprises a total of n juxtaposed ultrasonic transducer elements E1, E2, E3, . . . E(n−1), En. Transducer elements E1, E2, . . . En are connected to a multiplexer 10, which selects one of p=2 sub-arrays in each instance. This is indicated in the multiplexer legend by the ratio 2:1. Multiplexer 10 is addressed by a central control unit 12. A number m=n/2 of output lines leads from the multiplexer 10 to a delay unit 14. Delay unit 14 may be designed as analog or digital. It contains, in accordance with the number of leads m=n/2, addressable delay channels 16, which are characterized by delay times $T_1, T_2, \ldots T_{m-1}, T_m$. The chosen delay times $T_1 \ldots T_m$ are adjustable and correspond to the delay curves R1, R2, R of FIGS. 1 to 6. Delay elements 16 may comprise, for example, digital memories, e.g. RAMs. The m delay-address memories are controlled by a delay control unit 18, which in turn is controlled by central control unit 12 via a delay-address bus 19.

Note that in the present example not n, but only m=n/p delay channels 16 are needed. Delay channels 16 are used for evaluating (selectively by weighting) the echo signals of the total p of existing sub-arrays, p times in succession per active total aperture AP.

The output signals of delay channels 16 are supplied to a summation stage 20, in which they are composed (added up) to form a sum signal s. If the summation is accomplished in an analog fashion, this sum signal s is supplied to an analog/digital (A/D) converter 22. In principle, such an A/D converter could be contained in each of the individual delay channels 16, so that A/D converter 22 would not be necessary at this location. After emission of a first ultrasound transmission signal (ultrasound vector), a first sum signal s1 (from the first sub-array) is received at the output of A/D converter 22, and after emission of a second ultrasound transmission signal in the same direction, a second sum signal s2 (from the second sub-array is received at the output of A/D converter 22. Each of sum signals s1, s2 comprises a single digital word.

The output of A/D converter 22 is connected to a line or vector memory 24 as well as to a storage register 26. For the case of p=2 the length of memory 24 corresponds exactly to one ultrasound line A, as shown in FIGS. 1 to 7 (or I, II, III, IV, . . . in FIG. 8). Hence, line memory 24 can store e.g., 4000 words per ultrasound line. Each word characterizes the amplitude and phase of the RF signal s1 obtained from a specific site along scan line A or respectively I, II, III, . . . . For p=3 line memory 24 must store (p−1)=2 ultrasound lines side by side, so that a greater storage capacity is needed. Register 26, on the other hand, is dimensioned to receive a single digital word, for reasons of cost. The outputs of line memory 24 and of register 26 are connected to a summation or superpositioning stage 30, in which there occurs, in a well known manner, a word-by-word summation or superposition (by amplitude and phase). If, for example, p=3, the echo signals of the first two sub-arrays are added to the echo signal of the third sub-array true to location at every site along the ultrasound scan line. The result of the summation or superpositioning is a received signal E. Signal E corresponds to the not yet demodulated RF received signal of a conventional ultrasonic array. The received signal E is demodulated, further processed (not shown) and displayed on a screen 31 in the conventional manner.

As was explained above, in summation stage 30 the digital words of the sum signal s2 of an ultrasound line (stored in register 26 and received with the second sub-array are combined word by word with the content of line memory 24. This combining is done by adding sum signal s2 from a specific site along this ultrasound line to the information s1 determined for the same site of the same ultrasound line. If there are more than two sub-arrays (p>2), all of the sum signals s1, s2 ... sp will be added up here. (p−1) of these sum signals s1, s2 ... s (p−1) are stored in memory 24 while the last sum signal sp is stored word by word in register 26.

For controlling the summation or superpositioning process, a write/read/address control device 32 is provided which, on the output side is connected via a bus 33 to line memory 24 and, on the input side is connected via a write/read bus 34 to central control unit 12. Thus, write/read/address control device 32 organizes the reading in and out of line memory 24. Furthermore, an input of device 32 is connected to an output line 36 of central control unit 12 for receiving clock signals c. Clock signals c establish the word sequence and are also supplied to A/D converter 22 and to register 26.

In the FIG. 9 embodiment an entire ultrasound line is stored in line memory 24 in each instance. This results in a reduction of the frame repetion frequency by a factor which is determined by the number p of sub-apertures. In many applications such a reduction of the frame repetion frequency, as compared with conventional ultrasonic equipment, is acceptable. In return, the ultrasonic equipment shown has the merit that it can be realized cost-effectively.

The processing of the echo signals received from the sub-arrays of FIGS. 1 to 3 differs from that of the echo signals from the sub-arrays of FIGS. 4 to 6 only in the adjustment or programming of multiplexer 10 and of delay control unit 18. The illustrated principle can be applied to linear, sector or trapezoidal scans. As is evident from the embodiment of FIG. 9, conventional components normally used in ultrasound technology can be used.

An advantage of the described line-oriented method of superposition as compated with frame-oriented superperposition methods, e.g. according to U.S. Pat. No. 4,553,437 (of later publication date), is less sensitivity to motion artifacts and the use of a cost-effective memory 24 with a comparatively small storage capacity.

There has thus been shown and described novel method and apparatus for scanning an object with ultrasound signals which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by claims which follow.

What is claimed is:

1. A method for scanning an object by means of ultrasound signals, using for reception an ultrasonic transducer array comprising a number (N) of transducer elements lying side by side which form a reception aperature, said reception aperture being divided into a number (p) of individual sub-arrays, each sub-array having a plurality of transducer elements which, after sequential emission of ultrasonic transmission signals into the object, receive incoming echo signals, and where at least for some of the transducer elements, the output signals delivered therefrom upon reception of the echo signals can be time-delayed, said method comprising the following steps in the named order:
   (a) sending a first ultrasonic transmission signal into the object to be examined along a given scanning direction;
   (b) composing the incoming echo signals received from said first ultrasonic transmission signal with a first sub-array of the reception aperture in a processing circuit to form a first sum signal, which sub-array is directed to a plurality of focuses along said given scanning direction;
   (c) sending a second ultrasonic transmission signal along the same given scanning direction into the object to be examined;
   (d) composing the incoming echo signals received from said second ultrasonic transmission signal with a second sub-array of said reception aperture in substantially the same processing circuit as was used in step (a) to form a second sum signal, which second sub-array has different transducer elements from said first sub-array and is likewise directed to said same plurality of focuses along said same given scanning direction;
   (e) superpositioning at least said first and said second sum signals on each other to form a received signal, said superpositioning beginning after completing the composition of said first sum signal but not necessarily after the end of the composition of said second sum signal; and
   (f) processing and thereafter displaying said processed received signal as a line which is representative of scanning of said object along said given scanning direction.

2. The method according to claim 1, comprising:
dividing said array into interleaved sub-arrays 3. The method according to claim 1, comprising:
dividing said ultrasonic array into sub-arrays lying side by side.

4. The method according to claim 1, comprising:
dividing the total number (N) of transducer elements into a number (p) of sub-arrays of equal size.

5. The method according to claim 4, comprising:
dividing said transducer array into two sub-arrays.

6. The method according to claim 1, wherein:
step (e) occurs concurrently with the composing of said second sum signal.

7. The method according to claim 1, wherein:
after step (f), steps (a) through (d) are repeated along a scanning direction which is adjacent said given scanning direction.

8. The method according to claim 6, comprising:
dividing said array into interleaved sub-arrays.

9. The method according to claim 6, comprising:
dividing said ultrasonic array into sub-arrays lying side by side.

10. The method according to claim 8, comprising:
dividing the total number (N) of transducer elements into a number (p) of sub-arrays of equal size.

11. The method according to claim 9, comprising:
dividing the total number (N) of tranducer elements into a number (p) of sub-arrays of equal size.

12. The method according to claim 1, comprising:
varying the width of the reception aperture for focusing to different depths.

13. The method according to claim 1, comprising:
transmitting ultrasound signals at least twice in each of a plurality of scanning directions for effecting group stepping in a given scan direction.

14. The method according to claim 12, comprising:
transmitting ultrasound signals at least twice in each of a plurality of scanning directions for effecting group stepping in a given scan direction.

15. Apparatus for scanning an object by means of ultrasound signals, comprising:
an ultrasonic transducer array having a number (N) of transducer elements lying side by side which form a reception aperature, said reception aperture being divided into a number (p) of individual sub-arrays, each sub-array having a plurality of transducer elements which, after emission of an ultrasonic transmission signal into the object, receive incoming echo signals;
means for sending a first ultrasonic transmission signal into the object to be examined along a given scanning direction;
a first composing circuit for composing the incoming echo signals received from said first ultrasonic transmission signal with a first sub-array of the reception aperture in a processing circuit to form a first sum signal, which sub-array is directed to a plurality of focuses along said given scanning direction for forming said first sum signal;
means for sending a second ultrasonic transmission signal along the same given scanning direction into the object to be examined after said first sum signal has been formed;
a second composing circuit for composing the incoming echo signals received from said second ultrasonic transmission signal with a second sub-array of said reception aperture in said same processing circuit to form a second sum signal, which second sub-array has different transducer elements from said first sub-array and is likewise directed to said same plurality of focuses along said same given scanning direction for forming said second sum signal;
means for superposing at least said first and said second sum signals on each other to form a received signal, said superpositioning beginning after completing the composition of said first sum signal but not necessarily after the end of the composition of said second sum signal; and
means for processing and thereafter displaying on a display said processed received signal as a line which is representative of scanning of said object along said given scanning direction.

16. Apparatus according to claim 15, wherein:
said means for sending said first and said second ultrasonic transmission signals into said object, sequentially sends at least first and second ultrasonic transmission signals into said object along scanning directions which are successively adjacent said given scanning direction; and
said received signal fromed by said superpositioning means for each successive at least first and second ultrasonic transmission signals sent at a different scanning direction is immediately displayed without any substantial delay as another line on said display which is representative of said scanning.

17. Apparatus according to claim 15, wherein:
said first and second composing means includes a multiplexer connected to said transducer elements of said ultrasound transducer array, which multiplexer is controlled by a central control unit.

18. Apparatus according to claim 15, wherein said processing circuit includes:
a number (m) of delay channels having inputs connected to said first and second composing means and outputs connected to a first summation stage, the number (m) of delay channels being considerably smaller than the total number (N) of transducer elements of the ultrasonic array.

19. Apparatus according to claim 17, wherein said processing circuit of said first and second composing means includes:
a number (m) of delay channels having inputs connected to said multiplexer and outputs connected to a first summation stage, the number (m) of delay channels being considerably smaller than the total number (N) of transducer elements of the ultrasonic array.

20. Apparatus according to 19, wherein said means for superpositioning said first and second sum signals comprises:
a memory;
a register;
a second summation stage to which are supplied said first sum signal form said first sub-array via said memory and said second sum signal from said second sub-array via said register, said second summation stage summing said first ands econd sum signals for developing said received signal.

21. Apparatus according to claim 19 wherein, said reception aperature is divided into a number (P) of individual sub-arrays and said means for superpositioning comprises:
a memory; and
a register;
said memory and said register are of digital design, and said memory is dimensioned to store a given number of complete ultrasound lines, said given number being at least 1, but much smaller than the number of ultrasound lines used to form a complete ultrasonic image.

22. Apparatus according to claim 21, wherein:
said memory is laid out for storing a number of $(p-1)$ ultrasound lines, said number being one less than the number of transducer element sub-arrays.

* * * * *